L. KIRLIN.
Sub-Soil Plow and Planter.

No. 217,386. Patented July 8, 1879.

WITNESSES
Villette Anderson
F. J. Masi

INVENTOR
Linden Kirlin,
by E. W. Anderson,
ATTORNEY

UNITED STATES PATENT OFFICE.

LINDEN KIRLIN, OF NEW BOSTON, ILLINOIS.

IMPROVEMENT IN SUBSOIL-PLOWS AND PLANTERS.

Specification forming part of Letters Patent No. 217,386, dated July 8, 1879; application filed January 25, 1879.

*To all whom it may concern:*

Be it known that I, LINDEN KIRLIN, of New Boston, in the county of Mercer and State of Illinois, have invented a new and valuable Improvement in Subsoil-Plows and Seed-Planters; and I do hereby declare that the following is a full, clear, and exact description of the construction and operation of the same, reference being had to the annexed drawings, making a part of this specification, and to the letters and figures of reference marked thereon.

Figure 1:
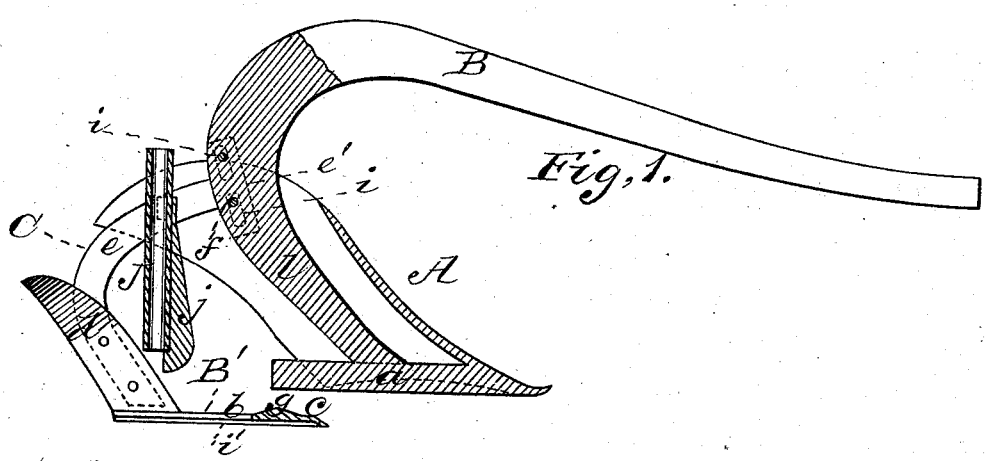
Figure 2:
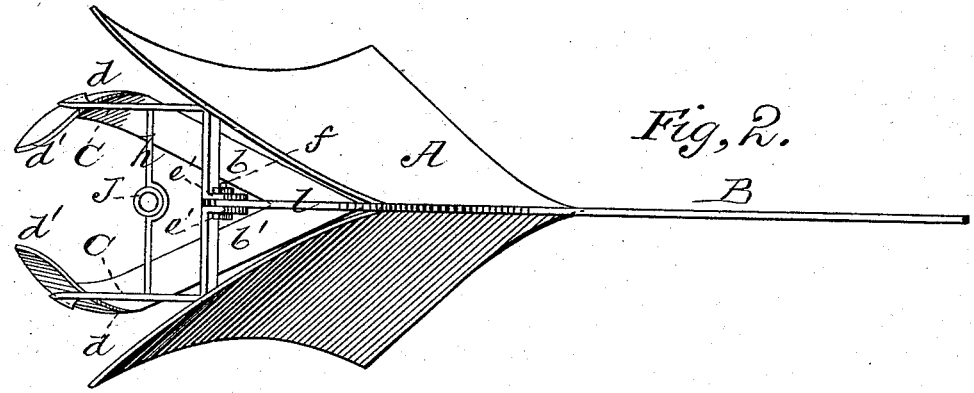
Figure 3:
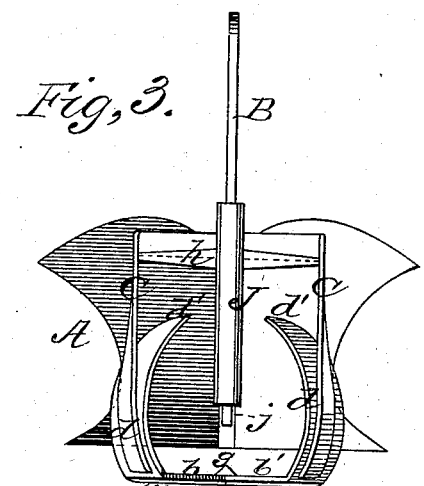

Figure 1 of the drawings is a representation of a longitudinal vertical section of my improved subsoiler and plow. Fig. 2 is a top view thereof, and Fig. 3 is a rear-end view of the same.

This invention has relation to improvements in subsoil-plows and planters.

The object of the invention is, mainly, to loosen, mellow, and pulverize the earth at the bottom of the furrow, so that the grain will have a bed of soft soil below it, and upon sprouting will push out its roots downward and laterally, thus not only obtaining a stronger growth, but also enabling the plants to resist being upset by the wind.

The nature of my invention will be hereinafter more fully set forth.

In the annexed drawings, the letter A designates an ordinary double plow, secured to a beam, B. This extends down behind the plow, and its lower end is bolted securely to a horizontal plate, $a$, running on the bottom of the furrow, and secured to the point of the plow. I do not, however, confine myself to any special mode of securing the beam to the plow, but may use any way of so doing which may commend itself.

B' designates the subsoiler, arranged in rear of the double plow, and secured to its beam by means of the subsidiary standards C. The subsoiler is composed of plates $b\ b'$, converging at an acute angle, and having a point, $c$, in line with the point of the plow. These plates are arranged horizontally, and have upon their lateral edges a downturned lip, $i'$, which causes them to take hold of the soil and bury themselves therein. At their rear ends they are bent upward and inward, as shown at $d$, forming coverers, which, acting as mold-boards, throw clean fresh earth toward the center of the furrows, for a purpose hereinafter shown.

The coverers $d$ have a slight backward inclination and a curvature in all respects resembling that of a mold-board, the upper ends thereof being bent in toward each other, as shown at $d'$. Usually the coverers are in one piece with the subsoiler proper, $b\ b'$, but not necessarily so.

C C indicate standards, rigidly bolted or secured to the coverers $d$, extending up in curved form, as shown at $e$, thence inward toward the plow-standard $l$ at right angles to their former direction, and provided at their ends with a cross-plate, $e'$, arranged vertically, and having oblong slots $i$ formed in it. These plates $e'$ embrace the plow-standard $l$, and are secured thereto by means of clamp-bolts $f$, extending through the slots $i$ of the standards C C and perforations in the plow-standard $l$. By loosening these bolts the subsoiler may be adjusted higher or lower with reference to the plow, and secured by reapplying the bolts $f$. At the junction of the plates $b\ b'$ is a ridge, $g$, in line with plate $a$, that lightens up the soil at the center of the furrow, where the grain is dropped. The subsoiler-standards C are connected together in front of the coverers $d$ by a brace, $h$, to which is rigidly secured a dropper-spout, J, of any desired form, the upper end of which is connected to a seed-dropping mechanism, mounted upon the sulky, to which the beam B is secured by means of a flexible or other tube.

The dropper and tube, being old, well-known devices in this connection, are not illustrated in the drawings.

The spout J has upon its front a vertically-arranged cutter, $j$, that extends below it a sufficient distance, and serves to furrow the mellowed earth in the bottom of the main furrow in advance of the spout, and to divide any vines, weeds, &c., which may have wound around the same. The spout, being in between the plates $b\ b'$ and in front of the coverers $d$, delivers the seed upon the soft bed of earth made by the subsoiler. The coverers then come into play and throw the earth of the bottom of the furrow from its sides inward toward its center, forming a small ridge. Consequently, in case of rain and sunshine immediately supervening after planting, the earth will not cake over the corn, the water having run off the ridge to the sides of the furrow.

What I claim as new, and desire to secure by Letters Patent, is—

1. The subsoiler B', consisting of the converging plates $b\ b'$, having lips $i'$, the coverers $d\ d$ upon their rear ends, and the standards C C, connecting the coverers and plow-beam, substantially as specified.

2. The subsoiler B', consisting of the converging plates $b\ b'$ and the coverers $d\ d$, the whole adapted to be adjustably attached to a double plow, substantially as specified.

In testimony that I claim the above I have hereunto subscribed my name in the presence of two witnesses.

LINDEN KIRLIN.

Witnesses:
P. L. BUNTING,
THEO. SCUDDER.